March 29, 1932.   J. A. DEAL   1,851,619
HOT AIR DISTRIBUTING APPARATUS FOR AUTOMOBILES
Filed March 26, 1931   3 Sheets-Sheet 1

Inventor
James A. Deal
By Clarence A. O'Brien
Attorney

March 29, 1932. J. A. DEAL 1,851,619
HOT AIR DISTRIBUTING APPARATUS FOR AUTOMOBILES
Filed March 26, 1931 3 Sheets-Sheet 2
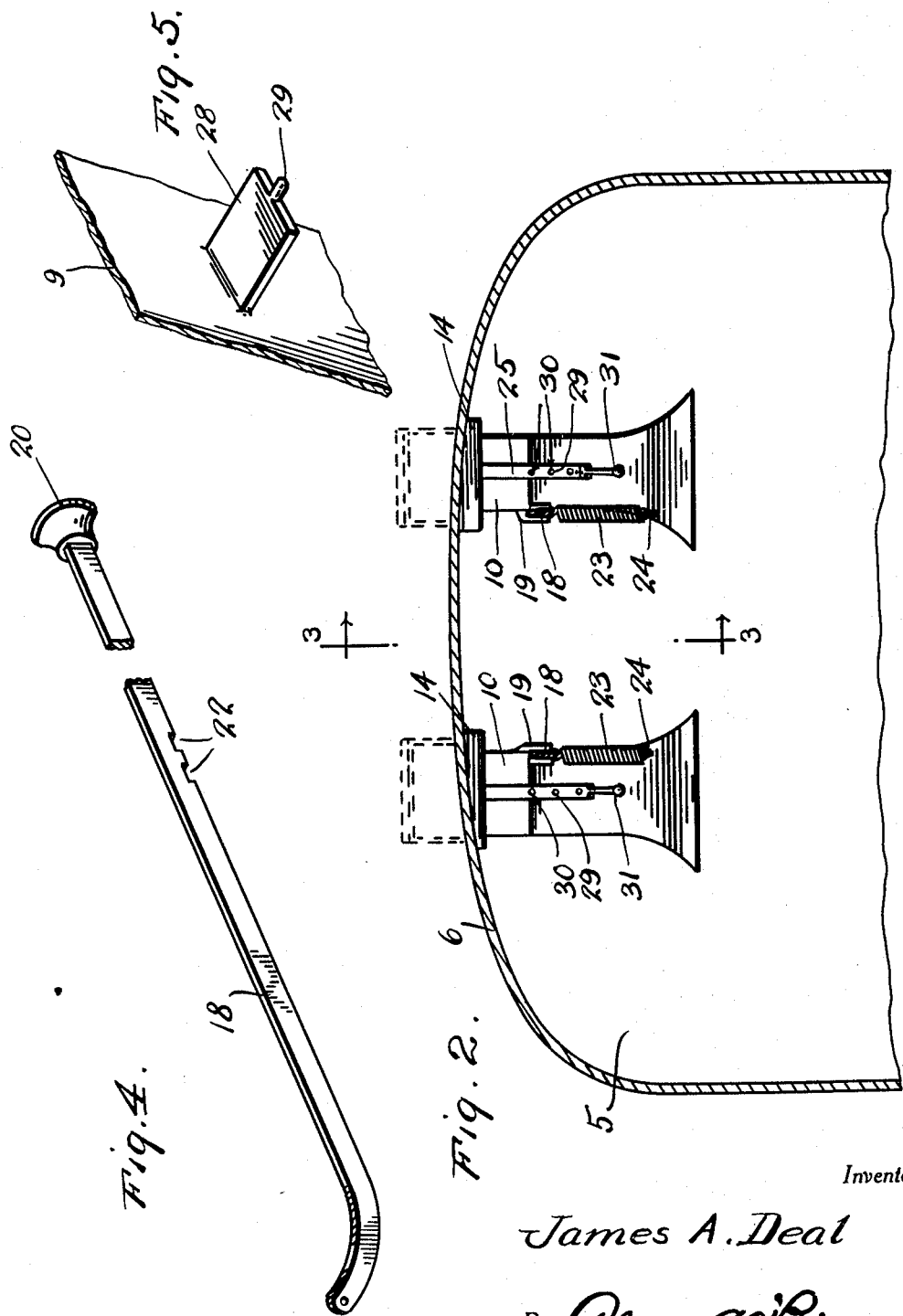
Inventor
James A. Deal
By Clarence A. O'Brien
Attorney

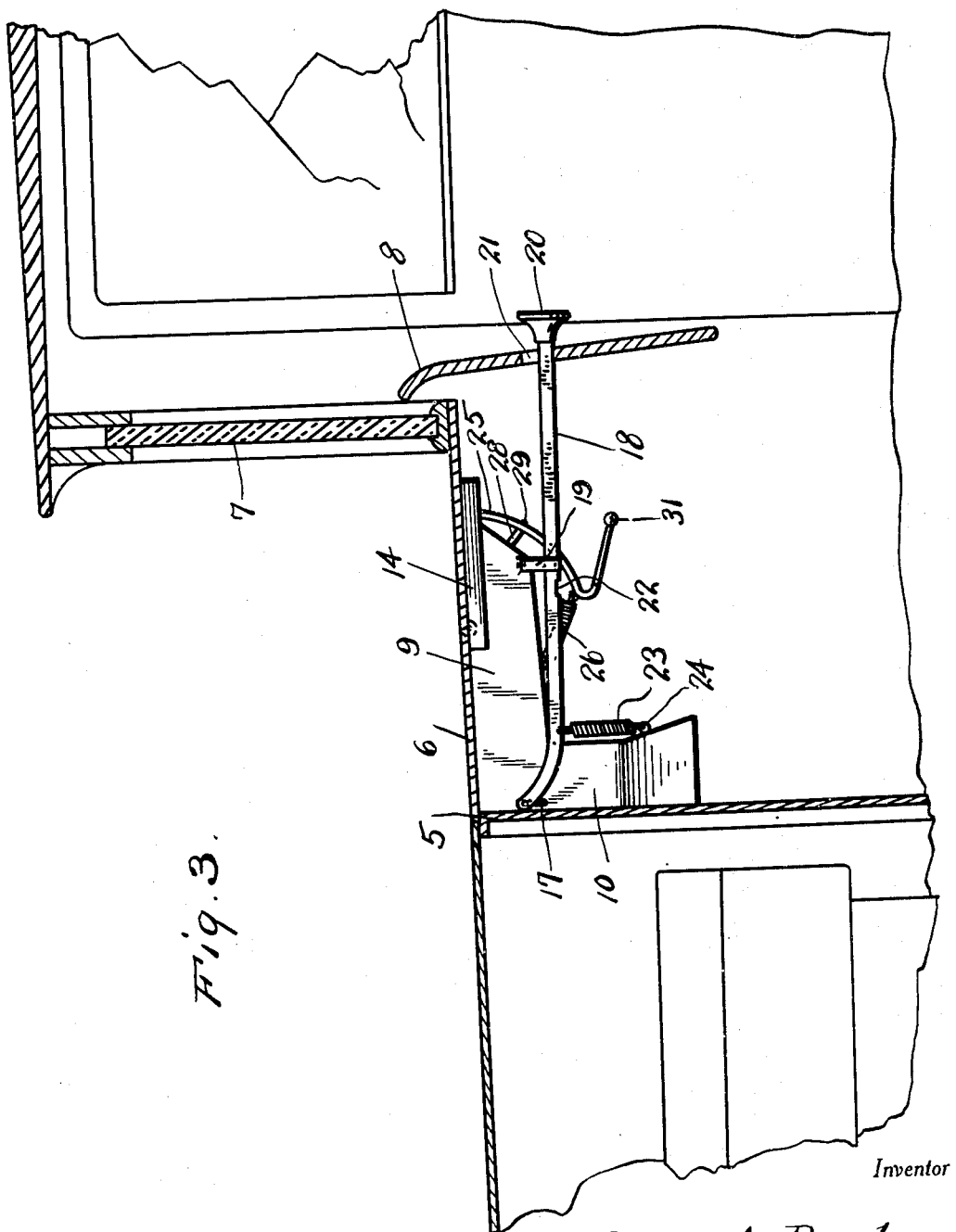

Patented Mar. 29, 1932

1,851,619

UNITED STATES PATENT OFFICE

JAMES A. DEAL, OF MARION, OHIO

HOT AIR DISTRIBUTING APPARATUS FOR AUTOMOBILES

Application filed March 26, 1931. Serial No. 525,581.

The present invention relates to an apparatus for use on automobiles and has for its prime object to provide means whereby hot air from the engine may be distributed either to the interior of the automobile or deflected on to the outside of the windshield to prevent the formation of sleet and the like thereon.

A further important object of the invention resides in the provision of an apparatus of this nature which is simple in its construction, inexpensive to manufacture and install, compact and convenient in its arrangement of parts, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 2 is a vertical transverse section taken substantially on the line 2—2 of Figure 1.

Figure 3 is a vertical longitudinal section taken substantially on the line 3—3 of Figure 2.

Figure 4 is a perspective view of a control rod.

Figure 5 is a fragmentary perspective view showing a lug with a teat projecting therefrom.

Figure 1:
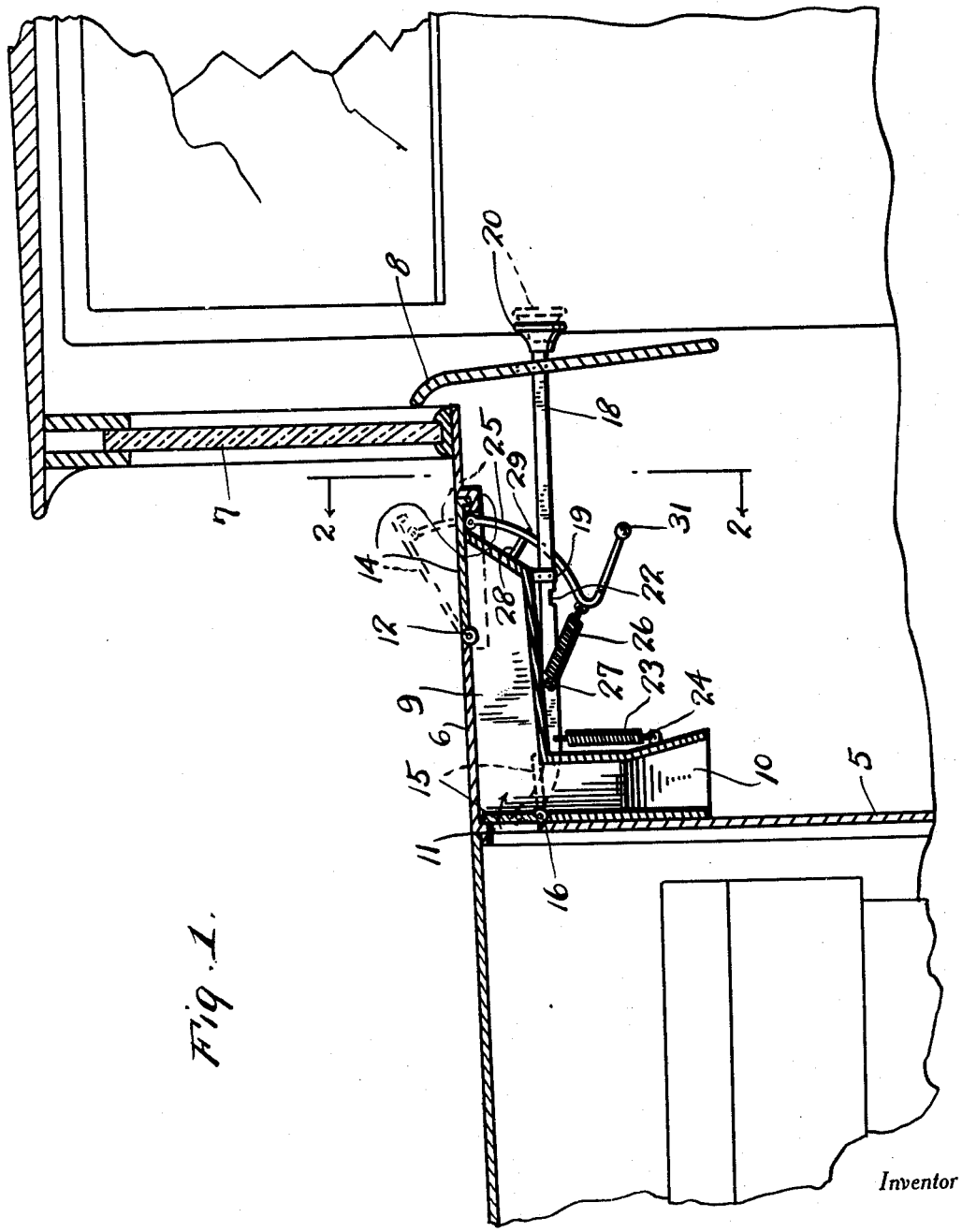
Figure 1 is a vertical longitudinal section through an apparatus embodying the features of my invention showing the same mounted in an automobile.

Referring to the drawings in detail it will be seen that the numeral 5 denotes the dash board of an automobile, numeral 6 the cowl thereof, numeral 7 the windshield thereof, and numeral 8 the instrument board thereof.

My apparatus is illustrated in the drawings in duplicate but this is not of the essence of the invention and for the purpose of simplicity I will refer in detail to only one apparatus because they are both of identical construction.

Each apparatus includes an angular conduit formed with a horizontal portion 9 communicating at its front end with a depending portion 10. The portion 9 is disposed under the cowl 6 while the portion 10 is disposed against the rear side of the dashboard 5. The dashboard 5 has an opening 11 registering with the interior of the conduit portion 9. The cowl has an opening in communication with the rear end portion of the conduit portion 9 and in this last mentioned opening is hingedly mounted as at 12 a closure 14. A closure 15 is mounted in the opening 11 to swing with a shaft 16 controlled by a crank 17 disposed to the inner side of the conduit. A rod 18 is slidable through a bracket 19 depending from the rear end of the conduit portion 9 and is connected at its forward end with the crank 17.

This rod 18 is slidable through a slot 21 in the instrument board 8 and terminates at its rear end in a knob or handle 20. In the bottom edge of the rod 18 are formed a pair of notches 22 for engaging with the bracket 19. A spring 23 is engaged with the rod 18 and anchored on the lower part of the portion 10 as at 24 and when the rod 18 is pulled rearwardly this spring tends to pull the forward end of the rod downwardly for holding the door 15 in the dotted line position shown in Figure 1. If it is desired to merely open the door 15 so that it will incline midway between the full line position and the dotted line position in Figure 1 the forward notch of the rod would be engaged with the bracket 19.

A curved rod 25 is secured to the closure 14 being pivoted thereto as will be apparent from an inspection of Figure 1. A spring 26 is engaged with this curved rod 25, the spring being anchored on an intermediate part of the portion 9 as at 27 so as to hold the curved rod against the outer end of a lug 28 projecting rearwardly from the rear end of the portion 9 and having a teat 29 projecting therefrom to engage with one of a series of openings 30 formed in said rods whereby the closure 14 may be held open the desired distance.

A handle 31 projects rearwardly from the bottom end of the curved rod so as to make the operation thereof more handy.

By manipulating the two rods so as to dispose the door 15 in the dotted line position and the closure 14 in the dotted line position of Figure 1 it will be seen that hot air from the engine may be delivered on to the outside of the windshield. By manipulating the rod 25 to hold the closure 14 in a closed position and partially opening the door 15 by proper manipulation of the rod 18 hot air from the engine may be delivered into the conduit portion 9 and down through the conduit portion 10 into the interior of the automobile.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination with the hood of an automobile having a ventilator opening and a door normally closing said opening, of a conduit disposed beneath the hood and having a branch leading to the ventilator opening and a second branch adapted to exhaust heated air into the interior of the automobile, said conduit being substantially L-shaped and at the junction of the branches provided with a hot air intake opening, and means arranged in the conduit for controlling said opening and the branches whereby heated air passing into the conduit may be directed through either or both of said branches.

2. In combination with the cowl having a ventilating opening and the dash board provided with an opening of an automobile, of a conduit connecting said openings whereby provision is made for directing heated air from beneath the hood through the ventilator opening to be subsequently directed on the windshield of the automobile, said conduit having a branch leading therefrom whereby a predetermined amount of heated air may be directed from the conduit through the interior of the automobile, and a hingedly mounted door in the conduit for controlling communication between said conduit and its branch.

3. In an apparatus for directing heated air on to the windshield and to the interior of an automobile and including in combination a conduit comprising a horizontal branch and a vertical branch, said horizontal branch having an outlet opening whereby provision is made for directing the heated air from said branch on to the windshield, and said vertical branch having an outlet opening whereby provision is made for directing heated air into the interior of the automobile.

4. In an apparatus for directing heated air on to the windshield and to the interior of an automobile and including in combination a conduit comprising a horizontal branch and a vertical branch, said horizontal branch having an outlet opening whereby provision is made for directing the heated air from said branch on to the windshield, and said vertical branch having an outlet opening whereby provision is made for directing heated air into the interior of the automobile, said conduit being located beneath the hood of the automobile and having its horizontal branch extending parallel to the cowl of the automobile and its vertical branch extending parallel to the dash board of the automobile, said horizontal branch having its outlet in alinement with the ventilator opening in the cowl, and said conduit at the junction of said branches provided with an opening in alinement with an opening provided in the dashboard whereby air heated by the internal combustion engine will be received into the conduit, and remote control means for controlling the passage of heated air through a selected one of the branches of the conduit.

5. In a device of the character described, an angular conduit having an outlet at one end positioned for directing heated air onto a windshield, and a second outlet at its other end for directing heated air into the interior of an automobile, a hot air inlet port for the conduit intermediate the ends thereof, and remote controlled means for controlling the entrance of air into the conduit and the direction of flow of such air to the outlets at the ends of the conduit.

6. In a device of the character described, an angular conduit having an outlet at one end positioned for directing heated air onto a windshield, and an outlet at a second end thereof for directing heated air into the interior of the automobile, a hot air inlet port for the conduit intermediate the ends thereof, and a valve controlling said hot air inlet and arranged to control the flow of heated air through said conduit.

7. In a device of the character described, a conduit provided with an outlet arranged to direct heated air onto a windshield, and a second outlet arranged to direct heated air into the interior of the automobile, said conduit being provided with a hot air inlet port, and valve means controlling said inlet port and arranged relative to said outlets for directing the heated air toward a selected one of said outlets.

In testimony whereof I affix my signature.

JAMES A. DEAL.